United States Patent [19]

Sklut et al.

[11] Patent Number: 5,760,775

[45] Date of Patent: Jun. 2, 1998

[54] APPARATUS AND METHOD FOR PROGRAMMING A JOB TICKET IN A DOCUMENT PROCESSING SYSTEM

[75] Inventors: Robert L. Sklut, Rochester; David L. Salgado, Victor, both of N.Y.

[73] Assignee: Xerox Corporation, Stamford, Conn.

[21] Appl. No.: 550,052

[22] Filed: Oct. 30, 1995

[51] Int. Cl.$^6$ ................................................. G06F 3/14
[52] U.S. Cl. ................................................ 345/349; 399/81
[58] Field of Search ................................ 395/349, 348, 395/339, 965, 970, 978, 807, 101; 399/81, 82, 83; 364/188; 345/349, 348, 339, 965, 970, 978, 302

[56] References Cited

U.S. PATENT DOCUMENTS

| | | | |
|---|---|---|---|
| 5,061,958 | 10/1991 | Bunker et al. | 399/81 |
| 5,079,723 | 1/1992 | Herceg et al. | 345/352 |
| 5,129,639 | 7/1992 | De Hority | 270/1.01 |
| 5,132,900 | 7/1992 | Gilchrist et al. | 707/9 |
| 5,220,674 | 6/1993 | Morgan et al. | 395/300.53 |
| 5,243,518 | 9/1993 | Holt et al. | 707/500 |
| 5,260,805 | 11/1993 | Barrett | 358/449 |
| 5,305,056 | 4/1994 | Salgado et al. | 399/11 |
| 5,398,289 | 3/1995 | Rourke et al. | 382/100 |
| 5,450,571 | 9/1995 | Rosenkrans et al. | 395/500 |
| 5,467,434 | 11/1995 | Hower, Jr. et al. | 395/114 |
| 5,524,085 | 6/1996 | Belluco et al. | 395/200.78 |
| 5,600,762 | 2/1997 | Salgado et al. | 395/114 |
| 5,604,860 | 2/1997 | McLaughlin et al. | 345/326 |
| 5,619,649 | 4/1997 | Kovnat et al. | 395/114 |
| 5,630,079 | 5/1997 | McLaughlin et al. | 345/335 |

OTHER PUBLICATIONS

Sarin, Sunil K., et al., "A Process Model and System for Supporting Collaborative Work," XAIT Reference No. 195, Xerox Corp., 1991.

*Primary Examiner*—Matthew M. Kim
*Assistant Examiner*—Crescelle N. dela Torre
*Attorney, Agent, or Firm*—Gary B. Cohen

[57] ABSTRACT

A job ticket programming system, adapted for use in a document processing system including a user interface, with a screen display, and an application server is provided. Preferably, the application server registers a first metaphor element corresponding with a first attribute set and a second metaphor element corresponding with a second attribute set. In practice, a metaphorical template, including the first metaphor element and the second metaphor element, and being represented by a combined attribute set with attributes from both the first and second attribute sets, is created for display on the screen display in response to displaying the first metaphor element on the screen display.

10 Claims, 14 Drawing Sheets

APPARATUS AND METHOD FOR PROGRAMMING A JOB TICKET IN A DOCUMENT PROCESSING SYSTEM

The Present Application is related in subject matter to and cross-referenced with both U.S. patent application Ser. No. 08/550,272 (entitled Apparatus and Method for Programming a Job Ticket in a Document Processing System) and U.S. patent application Ser. No. 08/550,053 (entitled Apparatus and Method for Programming and/or Controlling Output of a Job in a Document Processing System), both of which applications are attributable to the same Applicants as the Present Application, and both of which applications were filed on the same day as the Present Application.

The present invention relates generally to a technique for processing a job in a network document processing system and, more particularly, to a system for programming a job ticket based on a metaphorical template developed with one or more metaphorical elements.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

Digital copiers, as well as printers, are advantageous in that they can be coupled with other components, by way of a network, to facilitate image processing operations among the components. An example of network printing arrangement can be found in the following patent:

U.S. Pat. No. 5,113,494

Patentees: Menendez et al.

Issued: May 12, 1992

U.S. Pat. No. 5,113,494 discloses network printing system including a local area network (LAN) communication line with a plurlaity of connection nodes. Each node is associated with a suitable input/output subsystem. Each of the nodes communicaties with the network by way of a file server, one of which file servers includes application program as well as a raster image processor (RIP) and an image printer. The application program includes a network interface and a driver/host adpater permitting a coupling of the LAN communication line and the RIP.

As borne out by U.S. Pat. No. 5,113,494 a significant amount of control for a network printing system resides in server. Examples of systems including servers are disclosed by the following patents:

U.S. Pat. No. 5,220,674

Patentees: Morgan et al.

Issued: Jun. 15, 1993

U.S. Pat. No. 5,243,518

Patentees: Holt et al.

Issued: Sep. 7, 1993

U.S. Pat. No. 5,220,674 discloses a server which permits a plurality of clients to communicate with a pluraltiy of printers. The server is intended for processing printing requests that are sent to a printing system and responding to status requests regarding printing requests forwarded to the printing system. The server further provides the printers with resources which they may require to service printing requests and informs the other components of the digital data process of the status of the printing system, such as when it receives printing requests or when it becomes inoperable and needs attention.

U.S. Pat. No. 5,243,518 discloses a layered document services architecture facilitating operation and interconnection of electronic printing systems with both resident and non-resident work inputs, including: a resource layer providing a series of discrete modules and facilities for processing work; an application layer for enabling input of work from both resident and non-resident sources including a document services section and a service manager for coordinating and controlling access to the modules and facilities of the resource layer; and a control layer providing an operating system for coupling the service manager and facilities together in an operating environment, the control layer including a resource controller for prioritizing and distributing system resources to facilities in accordance with program inputs and system operating conditions.

Programming a job is often achieved with a "job ticket". For many printing systems, the job ticket is provided in the form of one or more programmable dialogs, each programmable dialog including values which are selected with a user interface, such as the user interface found in a DocuTech® printing system manufactured by Xerox Corporation. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size.

Since the programming for a job can be relatively complex, it is often desirable to provide a plurality of job tickets, corresponding with a plurality of dialog frames. In practice, each dialog relates to the programming of a set of job attributes, such as stock characteristics. The following patent relates to a technique in which multiple job tickets may be used to program a job:

U.S. Pat. No. 5,079,723

Patentees: Herceg et al.

Issued: Jan. 7, 1992

U.S. Pat. No. 5,079,723 discloses a touch dialog user interface for programming a reproduction machine through use of a touch control CRT screen with a display for providing a message area, user interface state selections, and plural tapped file folders. Each file folder, when opened, in turn, displays a smaller card file of tabbed cards with an adjacent work area. Each card in the card file, when opened, provides a display of icons representing first level machine programming selections for touch selection. Each icon, when touched, displays further icons representing second level programming selections in the work area for touch selection.

At least some of the basic concepts of U.S. Pat. No. 5,079,723 have been incorporated into the DocuTech® Printing System. The following references, among others, relate to the multiple job ticket scheme of the DocuTech Printing System.

U.S. Pat. No. 5,260,805

Patentee: Barrett

Issued: Nov. 9, 1993

U.S. Pat. No. 5,398,289

Patentees: Rourke et al.

Issued: Mar. 14, 1995

U.S. Pat. No. 5,260,805 discloses an electronic printing system with a touch screen for programming print jobs using job tickets displayed on the screen. The job tickets have various job programming choices together with scaled representations of a print image superimposed on selected print media, and a control for comparing the size of the print image, as originally oriented with the maximum image size. A full message is displayed on the screen, in the event that the print image size exceeds the system maximum image size, even though the print image as displayed fits into the print media.

U.S. Pat. No. 5,398,289 discloses a technique for printing a signature job, i.e., a job resulting in a plurality of sheets being imaged on signature print media sheets, in a selected order for creating a booklet. A plurality of job tickets are employed to program the signature job. In one aspect of the technique, lay-out work for the signatures to be produced is performed with a job ticket in which a gutter and margins are programmably set for each pair of electronic sheets on one side of an electronic signature sheet.

Certain versions of the DocuTech® printing system can be coupled operatively with one or more network clients by way of a DocuTech Network Server. A multiple job ticket scheme adapted for use in a Network DocuTech® Printing System is disclosed in the following pending patent application:

U.S. Pat. No. 5,450,571

Patentees: Rosekrans et al.

Issued: Sep. 12, 1995

The Network Printing System of the '155 application includes a print server having a plurality of print queues mapped with one or more mask files. Each of the queues communicates with one or more workstations and upon selecting one of the print queues with a selected workstation a mask file associated with the selected print queue is communicated to a job ticket processing application. An interclient job ticket, which represents all of the attributes of all of the printers associated with the print queues, is combined with the associated mask file to obtain a user interface dialog job ticket for display at the selected workstation. The user interface dialog job ticket displays the attributes of the printer associated with the selected print queue.

Other references relating with management of conflicts across a network printing system include:

U.S. Pat. No. 5,129,639

Patentee: DeHority

Issued: Jul. 14, 1992

Now Allowed U.S. patent application Ser. No. 07/936,477

Applicants: Hower et al.

Filed: Aug. 28, 1992

U.S. Pat. No. 5,129,639 discloses a system, usable with a network for comparing a set of print job requirements to a printer capability and determining the best match therebetween. When a mismatch occurs, the system determines the best match between requested, unavailable stock characteristics/finishing features and available stock characteristics/finishing features by determining a mismatch magnitude between the requested requirements and the machines capabilities. The stock characteristic/finishing feature with the lowest mismatch magnitude is designated.

U.S. patent application Ser. No. 07/936,477 discloses a system for determining the existence of a programming conflict in a network printing context. In particular, a job is programmed at a client workstation with a plurality of job requirments and transmitted to a remote printer for processing. The attributes of the remote printer are organized in a hierarchical list to provide an indication of viable attribute combinations. If the job requirmements are inconsistent with one of the attribute combinations, the client is provided with a suitable fault message.

When a multifunctional device is used on a network, a higher degree of job programming and conflict resolution may be required. In one instance, greater levels of job programming are provided by the following pending patent application:

U.S. patent application Ser. No. 08/315,273
Applicant: Salgado
Filed: Sep. 29, 1994

U.S. patent application Ser. No. 08/315,273 discloses a technique related to creating a composite job ticket for use in a printing system with a user interface. The job typically includes multiple job segments which are programmed for output at selected output/storage locations. In practice, attributes for each segment are captured in a respective job ticket and the resulting job tickets are combined to form the composite job ticket.

While the composite job ticket of the '273 patent application is believed to represent an advance in the art of job ticket programming, such composite job ticket, by its very nature may not be appealing, in terms of utilization, to the relatively inexperienced user of a network printing system. More particuarly, the manipulation of a relatively complex dialog with a substantial amount of text may not feel comfortable to those who seek a dialog that is both simple and accessible. Many users, even more experienced users, might very well prefer a dialog which readily illustrates the work flow aspects of a job. The concept of employing an object-oriented workflow model to facilitate data processing is disclosed in the following journal article:

A Process Model and System for Supporting Collaberative Work
Proceedings of the Conference on Organizational Computing Systems
(COCS'91)
Atlanta, Ga.
November, 1991

The above-mentioned journal article is directed to a model for collaborative work that provides for the decomposition of a collaborative process into units of work, the relative scheduling of these units of work, the flexible assignment and routing of units of work to people who will perform the work, and the presentation and manipulation of documents (or other data) needed in the context of performing the work. This collaberative process model supports the definition, execution, monitoring, and dynamic modification of organizational processes, and is implemented as an object-oriented network service.

It would be desirable to provide a composite job ticket that is simple, yet effective for use in programming a job to be processed in a network document processing system with multifunctional document processing capability. At the same time, it would be useful if that composite job ticket could employ concepts analogous to those set forth in the area of workflow so that the user of the composite job ticket could obtain a representation of job flow that illustrates the multifunctionality of the job in a manner that is both straight-forward and graphical.

The present invention employs network capability to achieve various advantageous ends. The following discussion is intended to provide a background for any appropriate network implementation required by the disclosed embodiment below: Examples of some recent patents relating to network environments of plural remote terminal shared users of networked printers include Xerox Corporation U.S. Pat. No. 4,453,128; 5,226,112; 5,287,194; EPO 0529818A3 pub. 03 Mar. 1993; and GB 2198566A pub. 15 Jun. 1988. Some patents on this subject by others include U.S. Pat. Nos. 4,623,244; 4,651,278; 4,760,458; 4,903,229; 4,953,080; 5,113,355; 5,181,162; 5,247,670 and 5,371,837. Further by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Some of these patents also disclose multi-functional machines (digital printer/scanner/facsimile/copiers) and their controls.

Some other network systems related publications include "Xerox Office Systems Technology" "... Xerox 8000 Series Products: Workstations, Services, Ethernet, and Software Development" ©1982, 1984 by Xerox Corporation, OSD-R8203A. Ed. T. Linden and E. Harslem, with a "Table of Contents" citing its numerous prior publications sources, and an Abstract noting the April 1981 announcement of "the 8110 Star Informations System, a new personal computer . . ."; "Xerox System Integration Standard Printing Protocol XSIS 118404", April 1984; "Xerox Integrated Production Publishers Solutions: . . . " Booklet No. "610P50807" "November 1985"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress™: The Source Book", Simon & Schuster, Inc., New York, N.Y., 1988, by Harrington, S. J. and Buckley, R. R.; Adobe Systems Incorporated "Post-Script® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted re commercial network systems with printers and software therefor is the 1992 Xerox Corporation "Network Publisher" version of the 1990 " DocuTech®" publishing system, including the "Network Server" to customer's Novell® 3.11 networks, supporting various different network protocols and "Ethernet™"; and the Interpress Electronic Printing Standard, Version 3.0, Xerox System Integration Standard XNSS 048601 (January 1986). Also, the much earlier Xerox Corporation "9700 Electronic document processing system"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart™" systems, first announced Sept. 13, 1990, are also noted. Current popular commercial "systems software" including LAN workstation connections is available from Novell®, Microsoft Windows™, and IBM OS/2.

All references cited in this specification, and their references, are incorporated by reference herein where appropriate for appropriate teachings of additional or alternative details, features, and/or technical background.

In accordance with one aspect of the present invention, there is provided a job ticket programming system for use in a document processing system with a plurality of metaphor elements supplied for programming a job associated with the job ticket. Each of the plurality of metaphor elements corresponds with either a set of document processing devices or a set of storage devices. The job ticket is programmed with a metaphorical template defined by one or more metaphorical combinations, each metaphorical combination including one or more of the metaphor elements. The job ticket programming system includes: a) an application server with a memory for storing first and second selection sets, each of the first and second selection sets corresponding with either the document processing devices available in the set of document processing devices or the storage devices available in the set of storage devices, said application server registering a first one of the plurality of metaphor elements with the first selection set and a second one of the plurality of metaphor elements with the second selection set; b) a user interface with a display screen for displaying the first one of the plurality of metaphor elements and the second one of the plurality of metaphor elements on the screen display of the user interface; and c) an image element for connecting the first one of the plurality of metaphor elements and the second one of the plurality of metaphor elements to form one of the one or more metaphorical combinations. In practice, 1) one of the selections in the first selection set is selected with said user interface, said application server determes which one or more of the selections in the second selection set are compatible for use with the selection of the first selection set and modifies the second selection set to form a modified second selection set which indicates the one or more second selection set selections compatible with the first selection set selection, and 3) the job ticket is programmed with both the first selection set selection and one of the one or more selections of the modified second selection set.

In accordance with another aspect of the present invention, there is provided a job ticket programming system for use in a document processing system with a plurality of metaphor elements supplied for programming a job associated with the job ticket. Each of the plurality of metaphor elements is associated with either the job or a device, the job including attributes describing a manner in which one or more documents are to be processed with the device, and the device including a set of device attributes defining capabilities currently available at the device. The job ticket is programmed with a metaphorical template being defined by one or more metaphorical combinations with each metaphorical combination including a plurality of metaphor elements. The job ticket programming system includes: a) an application server with a memory for storing a set of device attributes, said application server registering a first one of the plurality of metaphor elements with the set of job attributes and a second one of the plurality of metaphor elements with the set of device attributes; b) a user interface with a display screen for displaying the first one of the plurality of metaphor elements and the second one of the plurality of metaphor elements; and c) an image element for connecting the first one of the plurality of metaphor elements and the second one of the plurality of metaphor elements to form one of the one or more metaphorical combinations. In practice, (1) said application server determines whether a preselected relationship exists between the set of job attributes and the set of device attributes, and (2) the job ticket is programmed with the metaphorical combination when it is determined that the preselected relationship exists.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
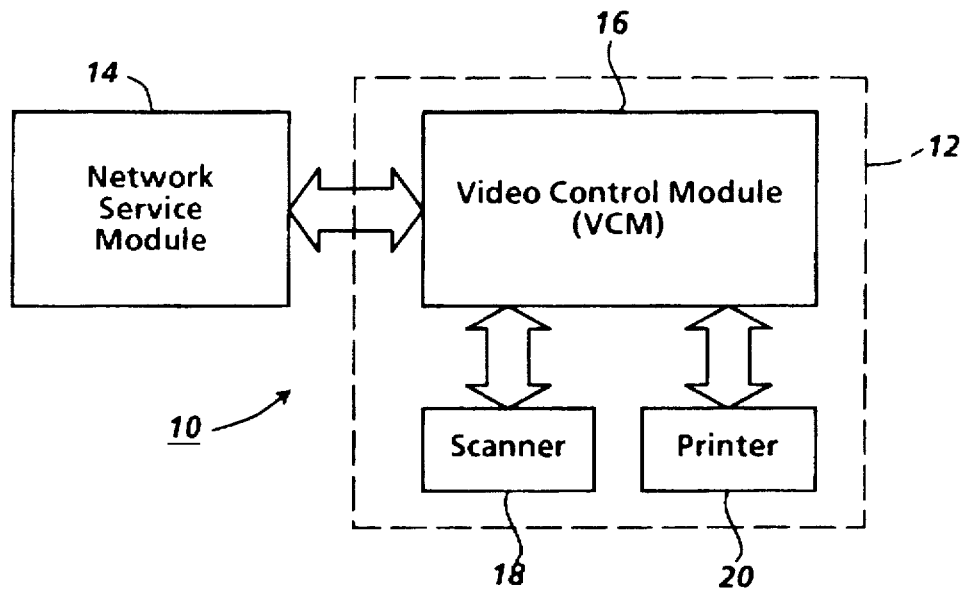
FIG. 1 is a block diagram depicting a multifunctional, network adaptive printing machine.

Referring to FIG. 1, a multifunctional, network adaptive document processing system is designated by the numeral 10. The document processing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the document processing system 10 could be implemented with a thermal ink jet or ionographic printer.

Figure 2:
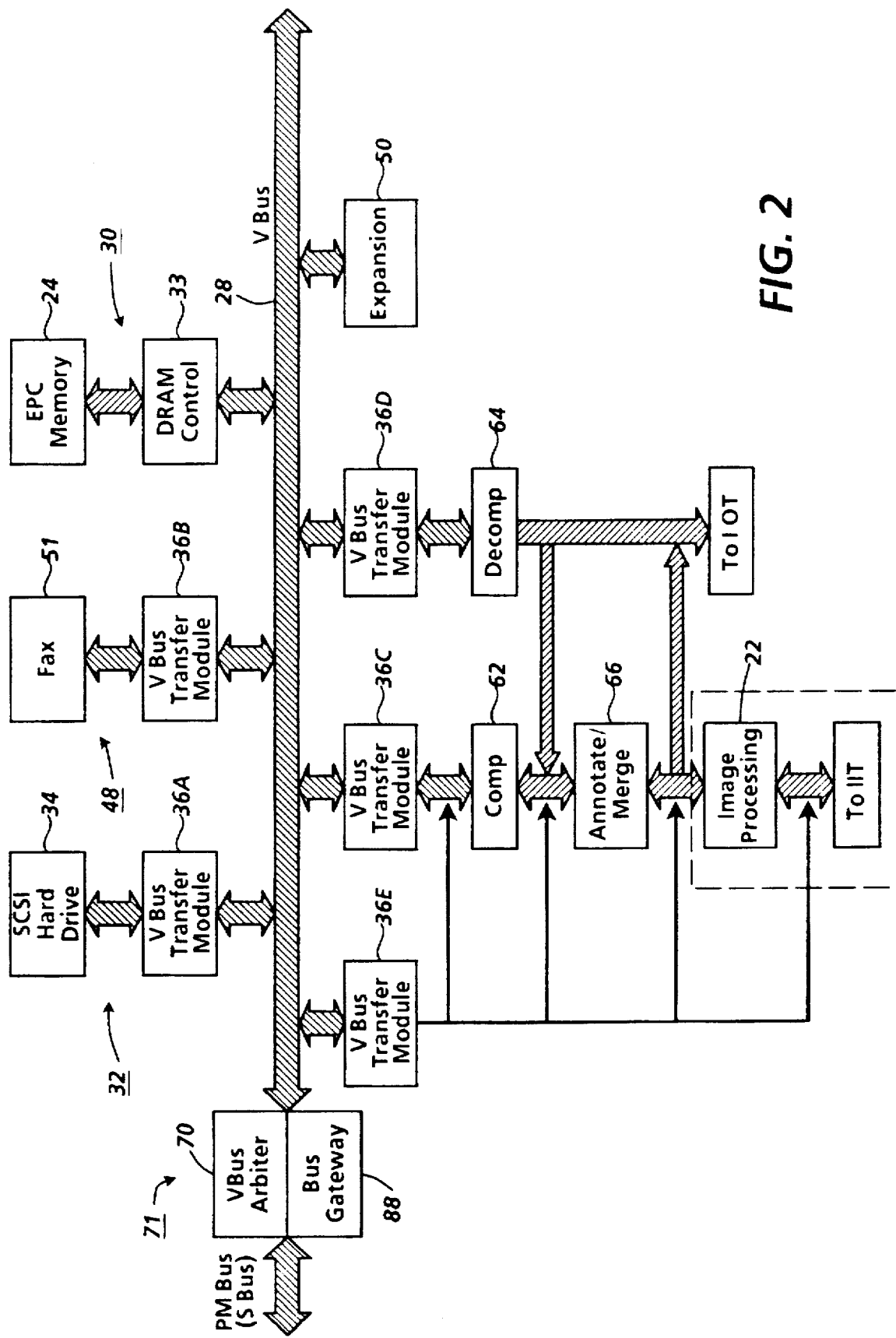
FIG. 2 is a block diagram of a representative video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
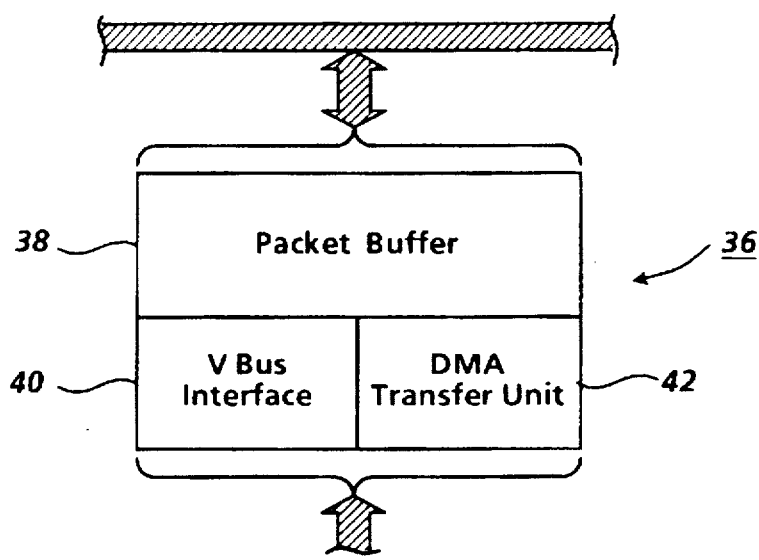
FIG. 3 is a block diagram of a representative transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes. Preferably, the packet size would be reduced for times when the VBus is relatively busy and increased for times when activity on the bus is relatively low.

Figure 5:
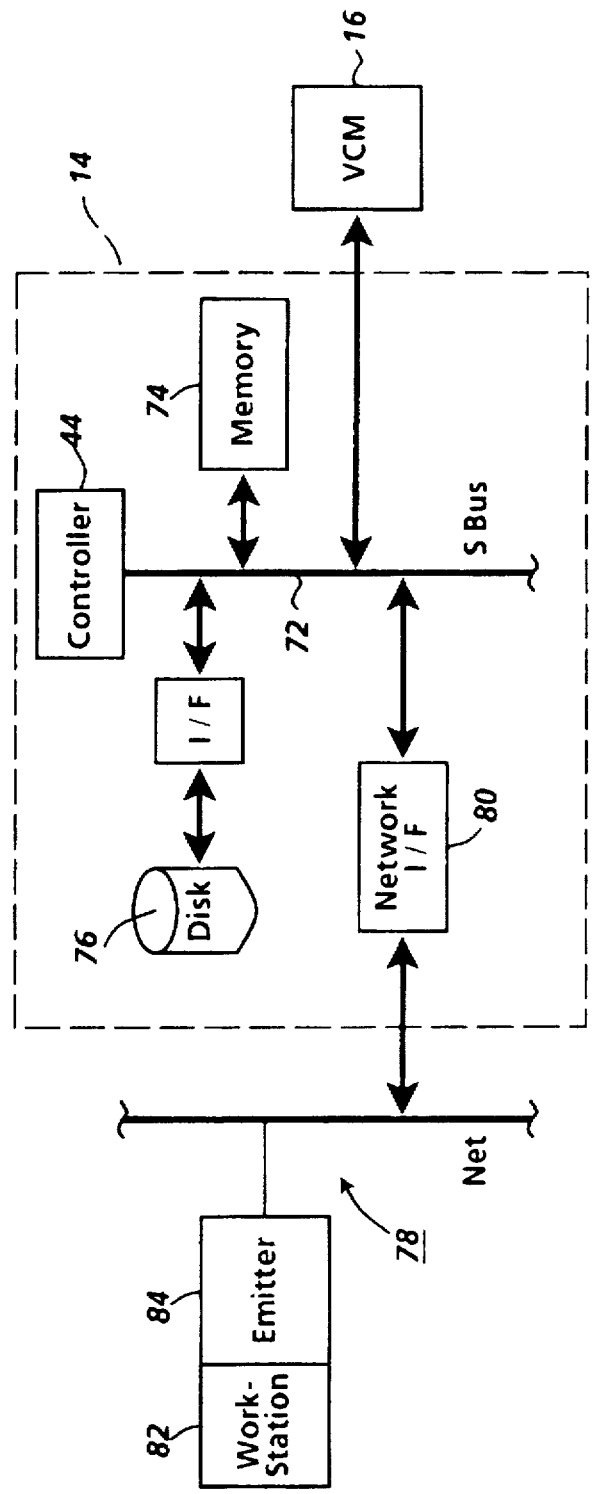
FIG. 5 is a block diagram of a representative network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
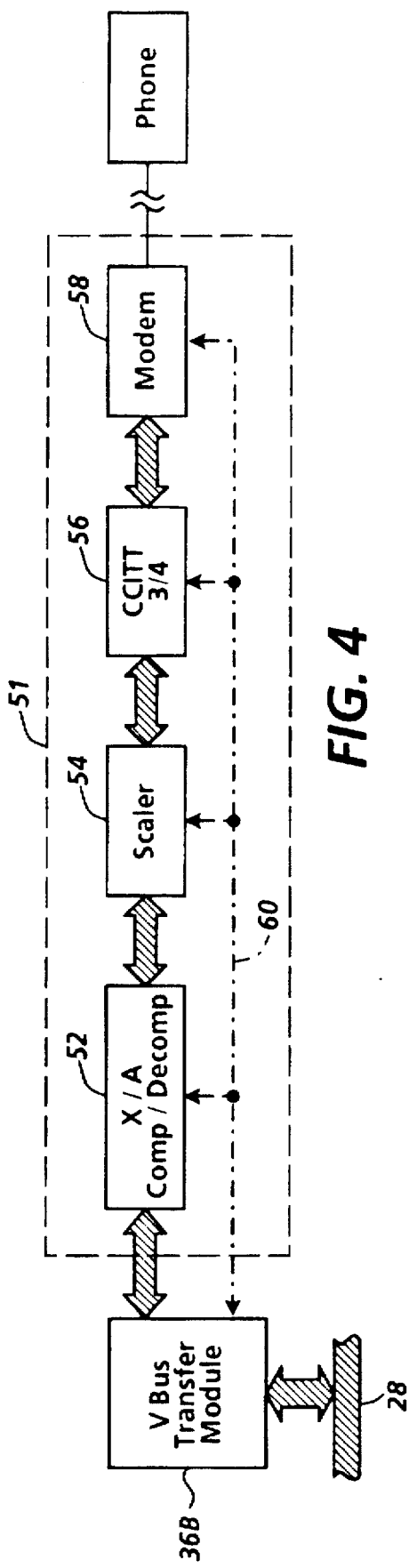
FIG. 4 is a block diagram of a representative facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® document processing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a Power PC processor, manufactured by Motorola, Inc., is coupled with a PCI 72. In the illustrated embodiment of FIG. 5, a host memory 74, which preferably assumes the form of DRAM, and a SCSI disk drive device 76 are coupled operatively to the PCI 72. While not shown in FIG. 5, a storage or I/O device could be coupled with the PCI with a suitable interface chip. As further shown in FIG. 5, the PCI is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual
Second Edition
Addison-Wesley Publishing Co.
1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host PCI and the VCM VBus. It provides VBus address translation for accesses to address spaces in the VBus real address range, and passes a virtual address to the host PCI for virtual addresses in the host address range. A DMA channel for memory to memory transfers is also implemented in the bus gateway. Among other things, the bus gateway provides seamless access between the VBus and PCI, and decodes virtual addresses from bus masters, such as one of the transfer modules 36, so that an identifier can be obtained from a corresponding slave component. It will be appreciated by those skilled in the art that many components of the document processing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet mannner, as described immediately above.

Figure 6:
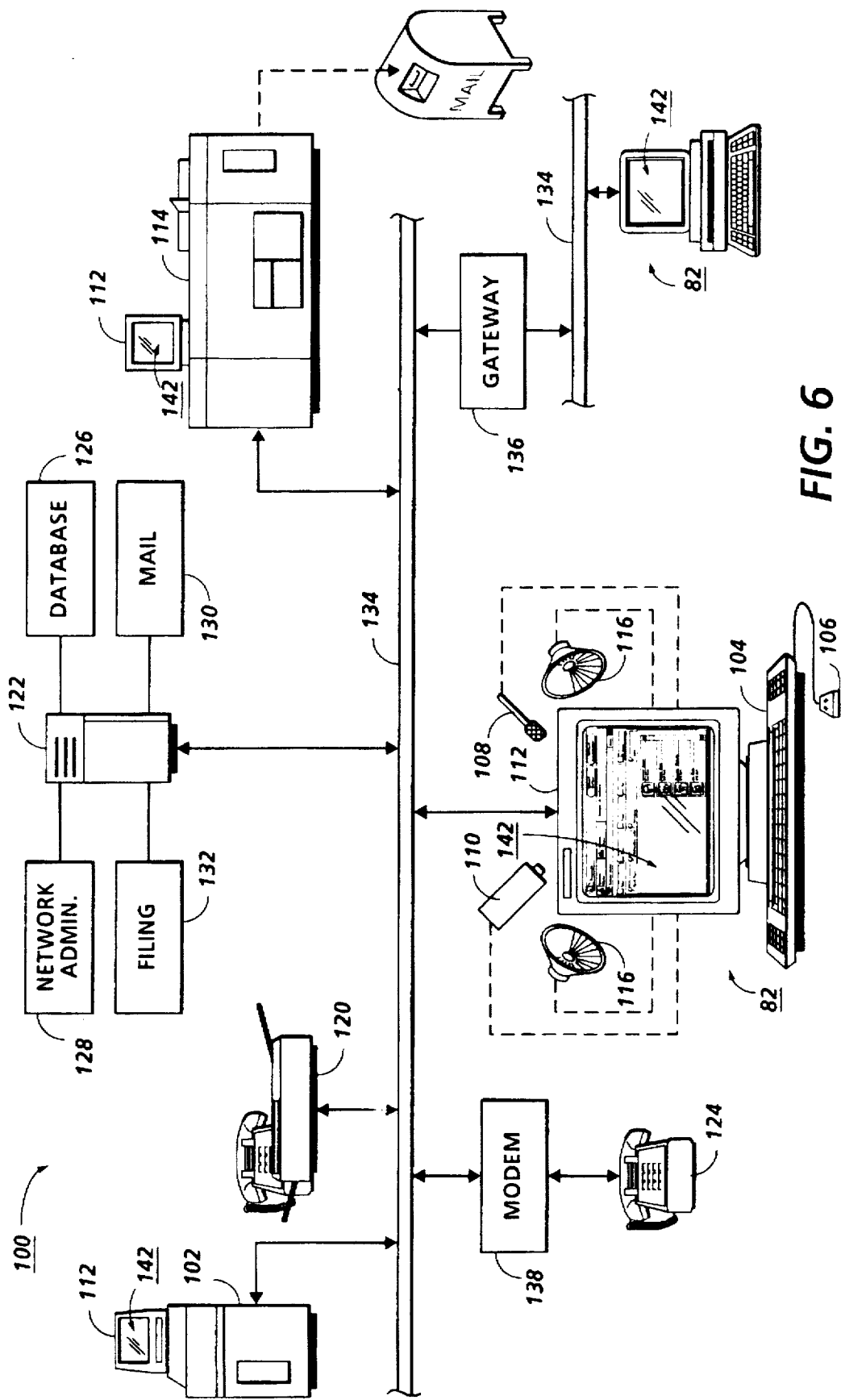
FIG. 6 is a schematic, perspective view of a representative network capable of implementing the metaphorical workflow technique illustrated in FIGS. 7–11.

Referring to FIG. 6, a network document processing system, suitable for implementing the metaphorical workflow technique of the preferred embodiment is designated by the reference numeral 100. As will be recognized, the network 100 can be implemented using a variety of hardware platforms and includes devices for input including scanner or digital copier 102, keyboard 104, pointing device or mouse 106, microphone 108, and video camera 110. The system further has devices for output including display terminal 112, printer 114, and speakers 116. Input/output (I/O) devices include facsimile 120, file server 122, and telephone 124. Server 122 is configured central to or remote from workstation 82 with public, shared and/or private data storage that is differentiated by user access rights. The server 122 includes relational database system 126, network administration system 128, mail system 130 (e.g. email, voice mail) and data storage and retrieval system 132, and can be physically configured using optical drives, hard drives, floppy drives and/or tape drives. The relational database system 126 provides systems with fast query and retrieval of data.

Workstation 82 operates in a collaborative environment, where users at different workstations 82 can work together in real time to process and distribute public, shared or private information existing in different forms. (Public data is defined herein as data accessible by anyone, shared data is defined as data accessible by a limited number of users and private data is data uniquely accessible by a single user.) Workstation 82 can exist in a distributed or centralized environment. In either environment, workstation 82 is connected to other systems and devices through local area network (LAN) or wide area network (WAN) 134, gateway 136, and/or modem 138. In distributed systems, a number of workstations extend distributed processing and storage capabilities to each other, by providing for example redundant storage or a single mounting of a unique application.

Workstation 82 includes an object oriented user interface (UI) 142 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview TM ("GV") software available from Xerox Corporation, which uses abstractions such as a desktop, inbasket, outbasket and documents. Referring still to FIG. 6, the UI 142 can operate remotely from any system; it is extensible across network services using remote windowing protocols such as X windows ("X Window System", W. Scheifler and James Gettys, Digital Equipment Corporation, U.S., 1992, ISBN 1-55558-088-2). For example, the UI on printer 114 is available remotely from any workstation 82 or alternate service such as scanner 102. Referring to FIGS. 7–11, a technique for implementing a metaphorical job ticket/control system with the network system of FIG. 6 is described. In general, the flow diagram of FIG. 7 describes a technique for configuring a database with the various profiles of the devices disposed on the network while FIGS. 8 and 9 describe a method for creating a job ticket with a metaphorical template in a manual context. Additionally, the flow diagram of FIG. 10 describes an implementation for creating a job ticket with a metaphorical template in an automatic context. While the flow diagram of FIG. 11 describes an enhancement to both the job ticket creation techniques of flow diagrams 8–10.

Figure 7:
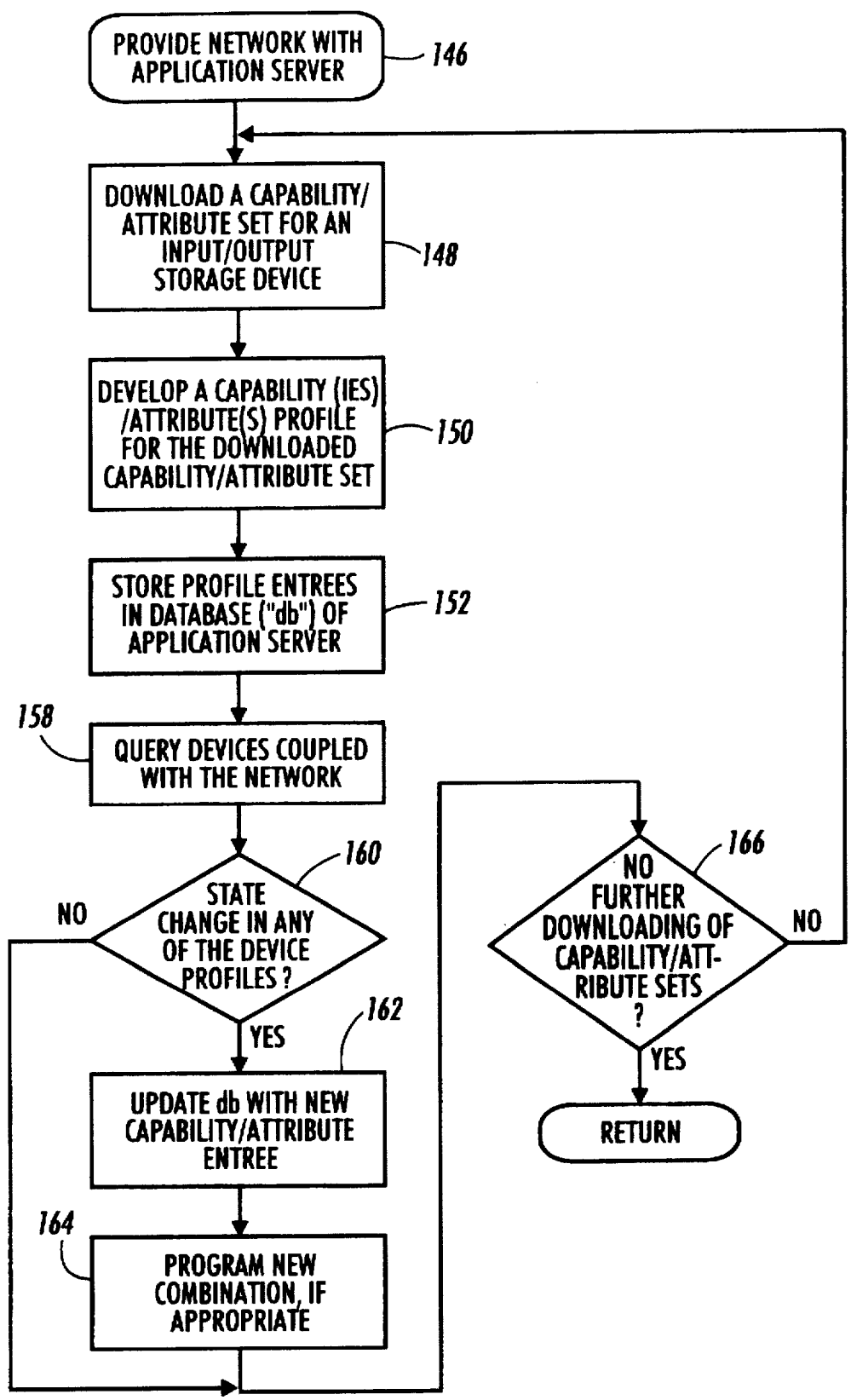
FIGS. 7–11 represent a flow diagram embodying various aspects of the inventive metaphorical workflow technique.

Referring specifically to FIGS. 6 and 7, a technique for configuring the network 100 for the metaphorical workflow technique is discussed further. At step 146, the server 122 is configured to serve as an application server. As will appear, the application server includes various elements of network administration, as provided by the network administration system 128 and the relational database 126. As will be appreciated, the server 122 may assume one of various forms. In one embodiment, the server 122 is similar to that disclosed by U.S. Pat. No. 5,220,674 to Morgan et al.; however, various suitable arrangements including one or more processors and appropriate storage capacity could be used to provide the functionality of 122.

At step 148, a capability/attribute set for an input/output/ storage device is downloaded to the application server. Downloading may be achieved by one of several known procedures available for use in servers such as the Xerox 8000 series or other suitable Xerox Network Systems. For each component coupled with the network 134, a profile representing the coupled component is developed (step 150) for storage in the database 126 (steps 152). For purposes of the present description, the capability of a device refers to each feature available for the device, whether that feature is enabled or not. An attribute of a device, on the other hand, refers to an enabled feature currently available to a user. As will be understood, there are various ways in which the profiles can be constructed for storage in the database.

Construction of the profiles (first mentioned above at step 150) in a preferred conceptual model can be understood by reference to FIGS. 14–17. The concept underlying construction of the profiles and their use in a "plug-and-play" context is grounded on a transfer function analysis and synthesis of the various profiles can be described with a simple water flow plumbing metaphor. By reference, complex analysis and synthesis problem spaces are often compared to water flow within some type of fictitious plumbing. At the root of the preferred profile construction is the essential mapping of all component elements e.g. scanners, printers, etc. to simple, unambiguous and generally uniform transfer functions, where a well known type of input is transformed into a known type of output using a description of specific options required. Although the underlying engineering requirements are more complex than just this simple operator perceived view of a service, both the engineering intensive and customer focused sides center on the concept "this goes in, modified by these options, to get this out".

Modeled from the larger engineering perspective, a service, i.e. the functionality provided by a given device or element could be argued to have a description containing the following elements:

1) I consume a well known form of input, described in an unambiguous way;

2) I export a well known form of output, described in an unambiguous way;

3) I allow for the modification of my input-output (transfer function) relationship within certain well established bounds by providing adjustment capability to some aspects of my transfer function;

4) I require well known resources from my environment;

5) I am constrained by certain aspects of my environment (e.g. the state of other services) and must therefore be informed about certain events outside my immediate control (I am a consumer of the events of others); and 6) I have a well behaved effect on my environment and am willing to inform my environment of certain aspects of my behavior on an ongoing basis (I am a producer of events for others).

Figure 14:
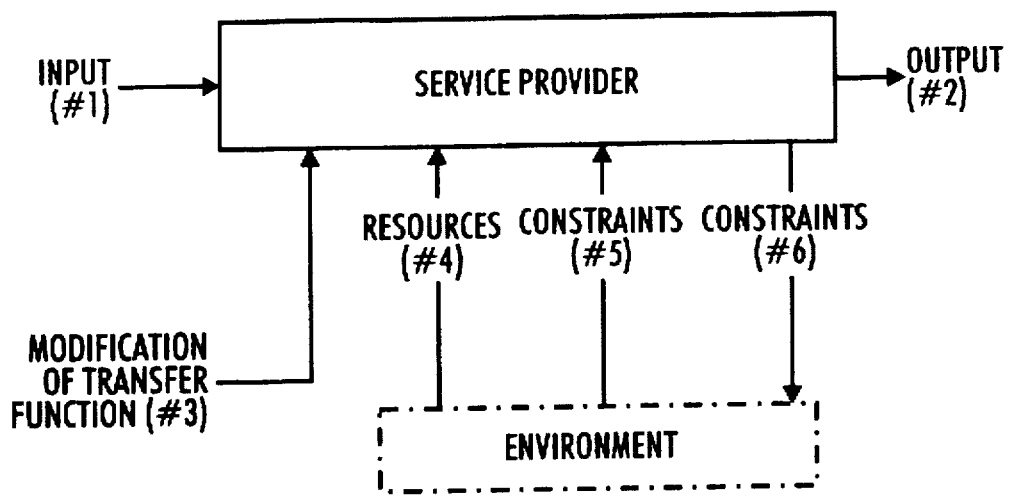
FIGS. 14–17 are schematic exemplary representations of transfer functions, each of which transfer function includes a service provider for implementing an element of a given metaphor.

In this text tool description, the pronouns "I" and "my" were used in a specific (object-oriented) manner to indicate that each service, as proposed here, must be treated as autonomous individuals, and so long as the aforementioned interactions are fulfilled, each service thus defined can function with any other service appropriately defined. Referring to FIG. 14, an abstract service functioning in conjunction with the above constraints is shown. Defined as such, a "Service Provider" need not be a purely technological component but could rather be a human provided process, or a hybrid process combining the capabilities of both humans and technology in order to accomplish a desired task.

Referring specifically to FIG. 14, a complete service provider transfer function template is shown. Further study of the model of FIG. 14 indicates that interactions with the "Environment" are an artifact of the technology employed, and as such, most casual users would not be interested in them. It is possible to "hide" such infrastructure components and interactions from such users through strong adherence to specific interface designs and by allowing such "Service Providers" (which, on a macro scale, are nothing more than large objects in an object-oriented sense) access to dynamic run time resource registration databases.

Figure 15:
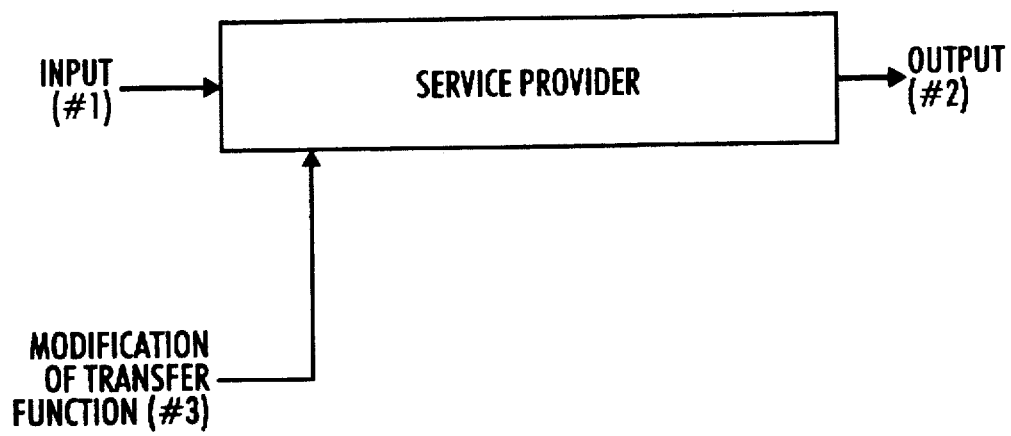
Figure 16:
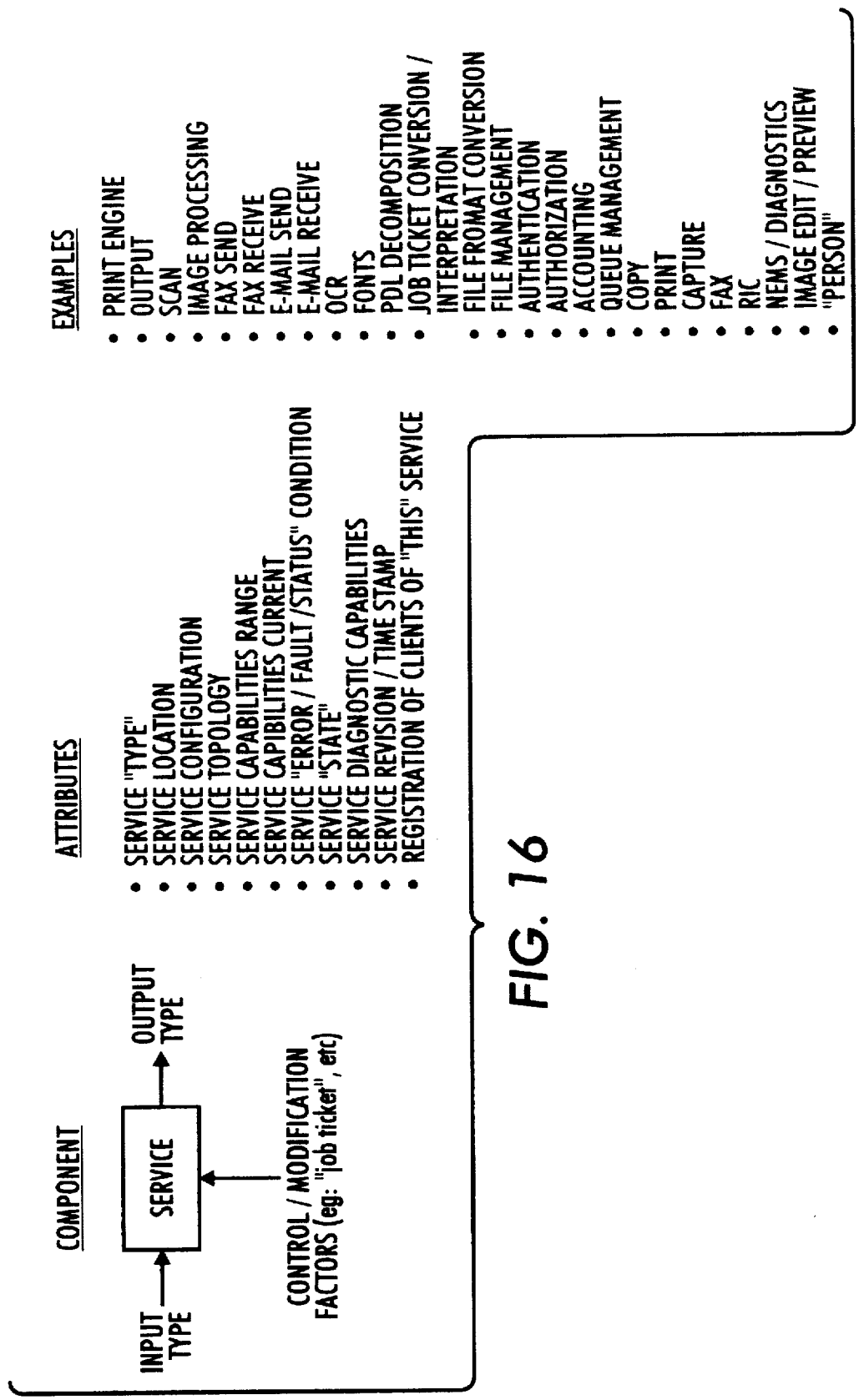
Figure 17:
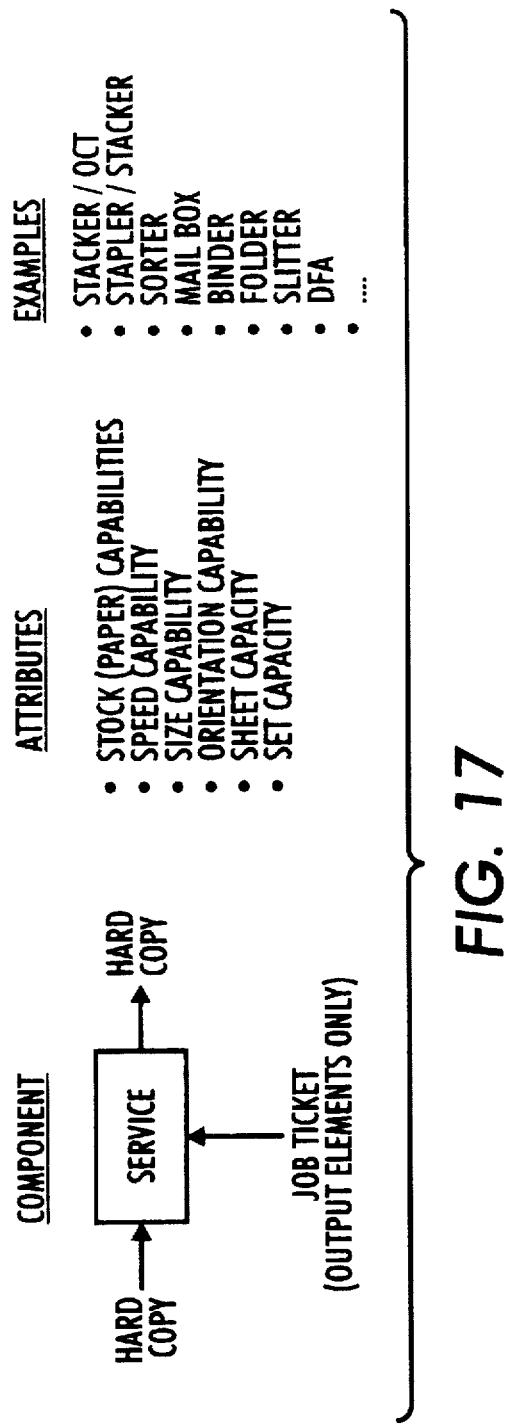

Referring to FIG. 15 (showing an operator view of the service provider transfer function template), given the above-mentioned "hidden" infrastructure support, the view of the model of FIG. 14 can be simplified as shown. Referring to FIG. 16, an overview of a transfer function for a system is shown. In the model of FIG. 17, a given service provider will modify an input type with certain control/modification factors, and such control/modification factors will vary as a function of a given attribute set. Various examples of services suitable for use in a service provider transfer function are also listed in FIG. 16.

Referring to FIG. 17, a specific example illustrating the functionality of a given service provider transfer function is shown. As can be seen, a hard copy is provided to an output, such as a stacker or sorter, and the resulting output is controlled by the job ticket which includes one or more attributes, such as currently available stock (paper). As will appear from the discussion below, a Service Provider transfer function can correspond to either a single component, such as a single stacker or to a composite element including a plurality of devices, such as a binder, folder and slitter. As will also appear from the discussion below, the combination of plural service providers may constrain the associated attribute set.

Describing a series of relevant "Service Providers" along this transfer function metaphor and providing the operator with a visual means of interacting with these components is the basis of the metaphorical workflow strategy which is a significant concept underlying the subject matter of the present disclosure. Essentially, what is being provided to the operator is a means of describing a complex workflow scenario based upon its component parts and interactions between those parts. Beyond providing an operator with a visual "plumbing" diagram of how their workflow task is constructed, a visual description of what is currently happening could easily be provided, along with providing controls at each important "Service Provider" in order to modify the total workflow progress. Examples of uses of a visual workflow programming metaphor will follow.

Since new devices are constantly being coupled to the network and revised software is being provided on a regular basis, it is preferable to regularly query all devices coupled with the network (step 158) to determine if a transfer function associated with the device has been altered while the database 126 is being configured. In a preferred embodiment, the periodic query of step 158 would not be necessary in that the application server would be registered with each device on the network to receive event related information to determine dynamic alterations in the respective transfer functions of the network devices. Further discussion regarding the device transfer functions of the network is provided below. When a state change occurs in any of the device profiles associated with the network (step 160), the database 126 is updated dynamically with the new capability/attribute entry (step 162) provided by the device undergoing capability/attribute upgrading. A system for updating the database may be readily implemented through use of the ISO document processing architecture (DPA) standard as envisioned by ISO/IEC 10175. The DPA has its origin in the Palladium print system which is a distributed print system developed at MIT/Project Athena with the participation of Digital Equipment Corporation, International Business Machines and Hewlett-Packard. The "Palladium Design Document", a publication of the Massachusetts Institute of Technology, published on June, 1991, provides a detailed discussion of the ISO DPA.

Following step 160 and/or 162, the illustrated approach of FIG. 7 provides, via step 164, for the programming of a new combination or combinations when appropriate. In one example, an administrator of the server 122 enters the system and programs one or more basic combinations supported by the downloading of the current capability/attribute set(s). While in one example, the server administrator may hard code the one or more new combinations, in an alternative example, the combination(s) could be developed dynamically with a suitable API as disclosed in now allowed U.S. patent application Ser. No. 07/936,477. If more capability/attribute sets are to be downloaded (step 166) to the application server, then the process returns to step 148, otherwise an exit from the routine of FIG. 7 is effected by a return and the process is reentered at a subsequent time to add more capability/attribute sets when necessary.

Figure 8:
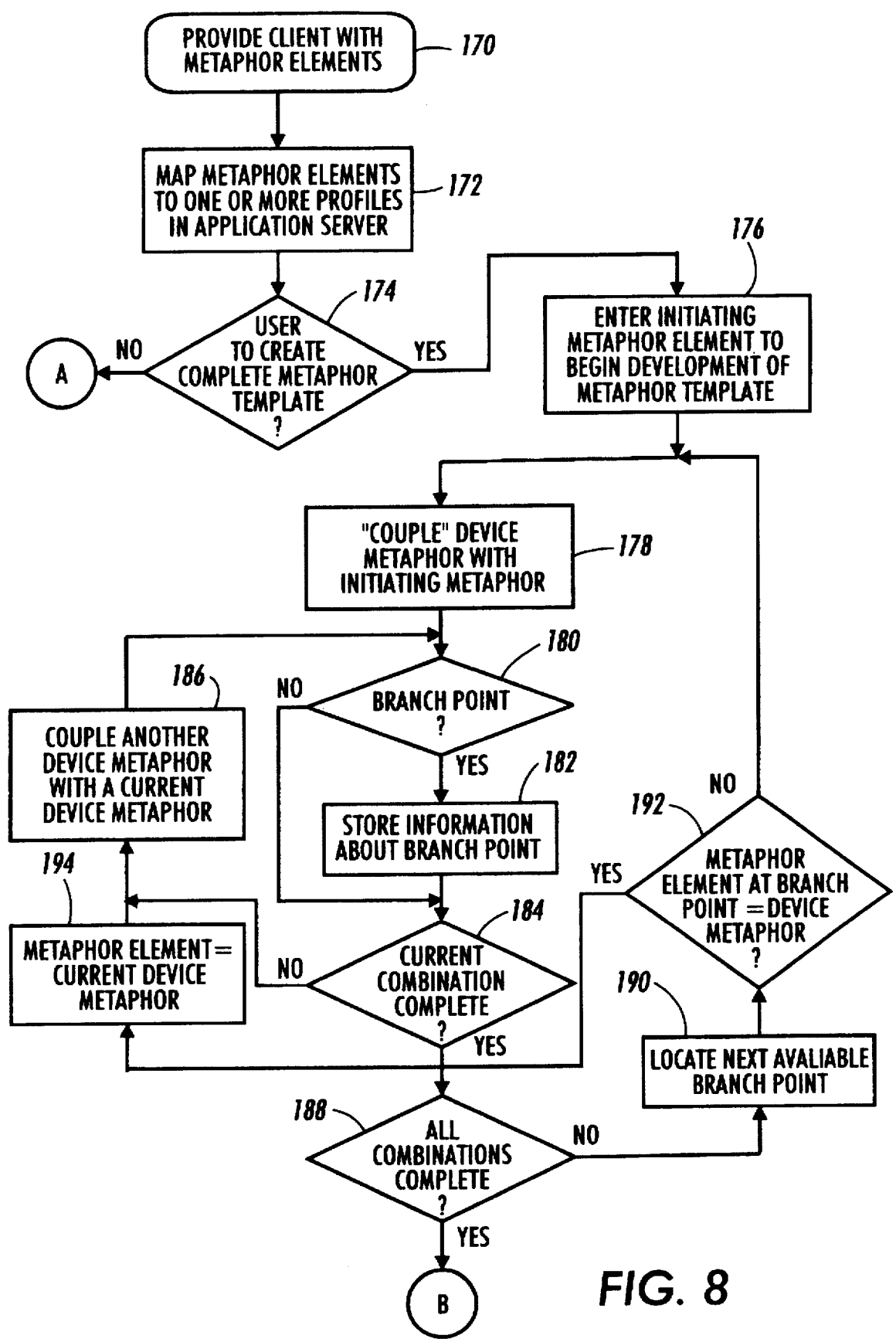

Referring now to FIG. 8, at steps 170, 172, one or more profiles are mapped to one or more metaphor elements, respectively. In one example, the metaphor elements are conventional pictograms mapped with the profiles in a known manner. In one application of the Xerox 6085 workstation, a profile of print attributes is mapped to a printer icon. In one embodiment, the user is provided with a selection from a plurality of metaphor elements. These may be provided by way of a common file which is accessible to users across the network.

Figure 12:
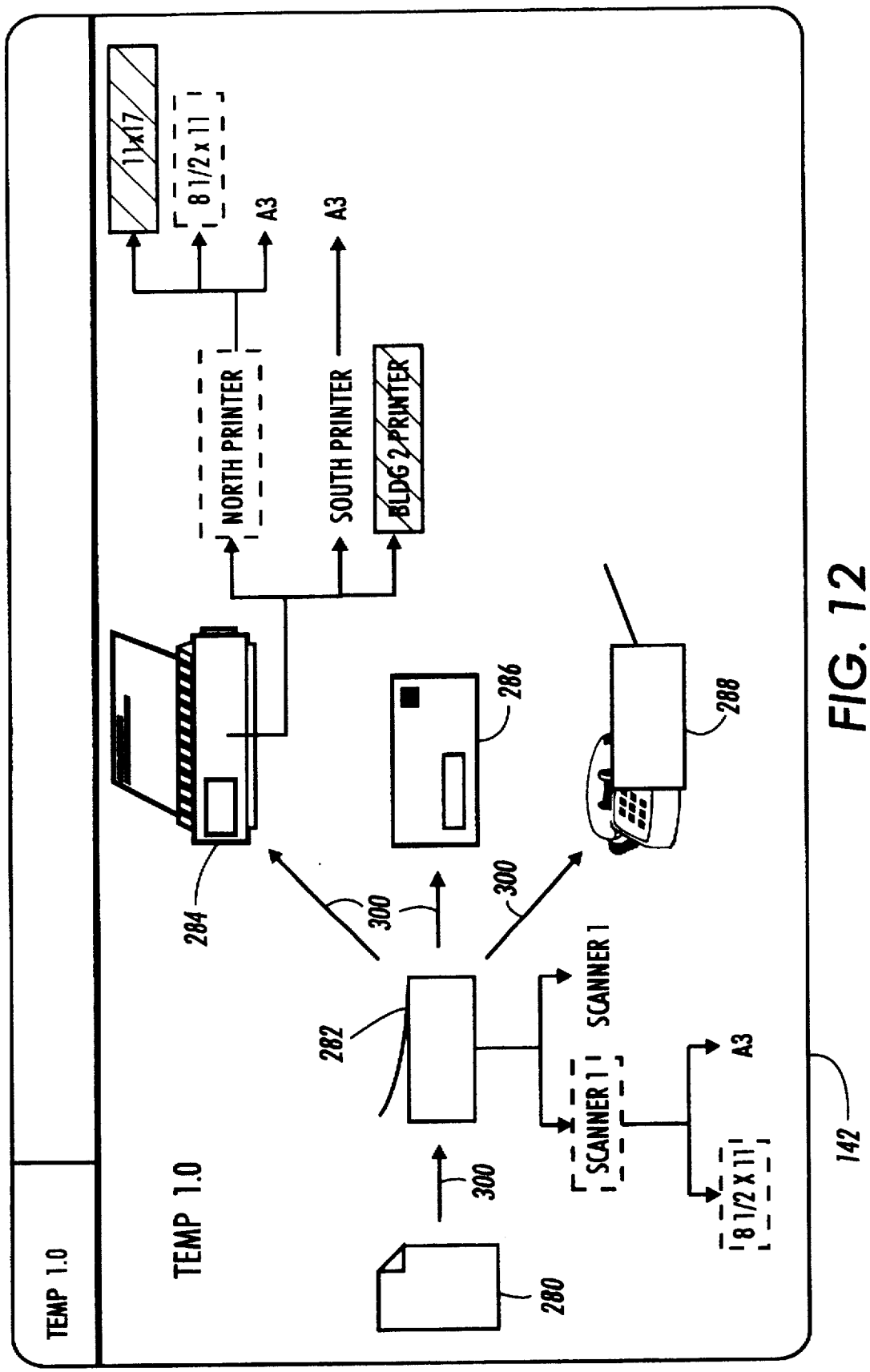
FIGS. 12 and 13 are partial screen displays including exemplary metaphorical workflow representations used to create job tickets for directing the execution of a job.
Figure 13:
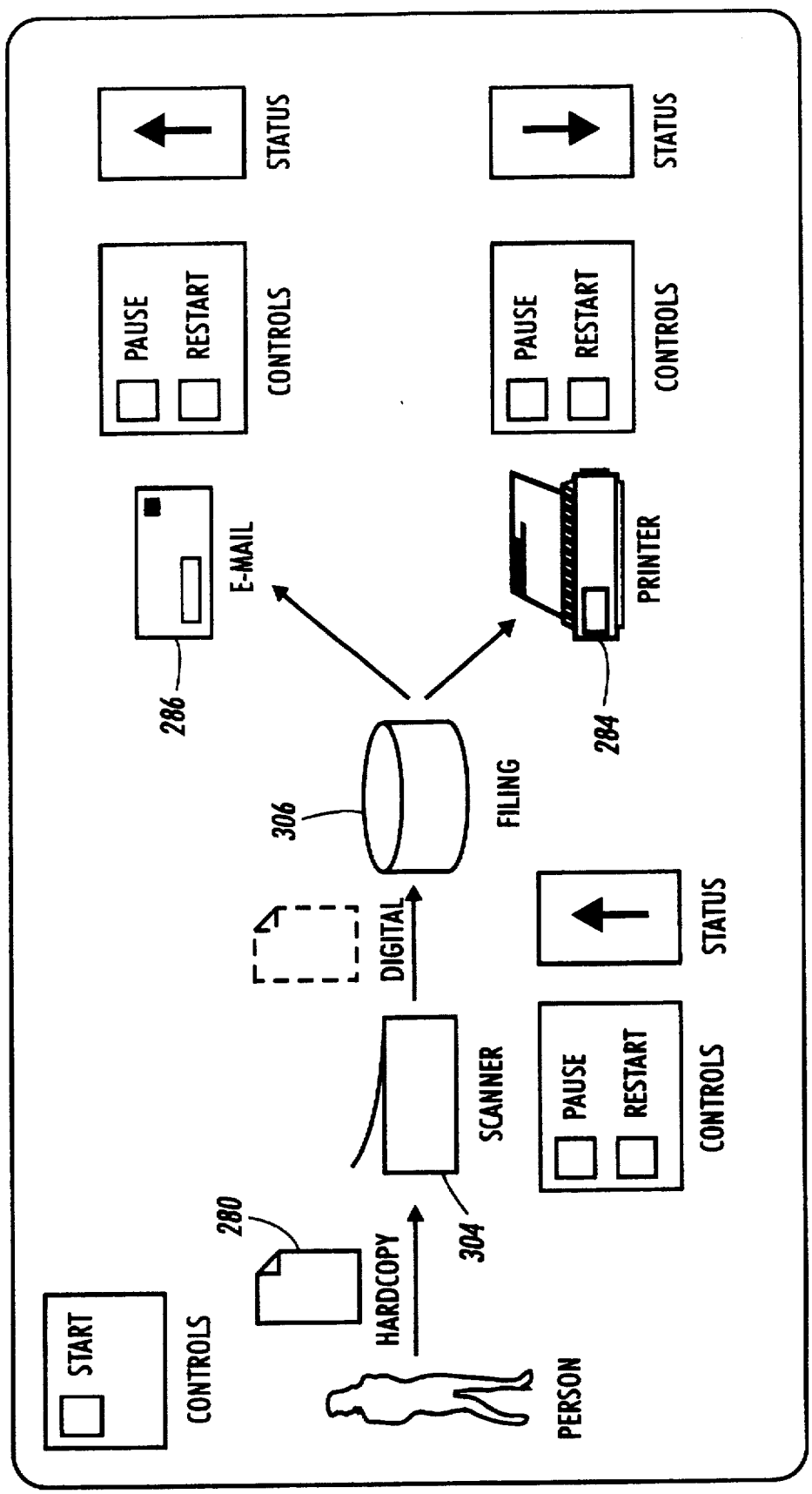

The process, at step 174, provides a user with the capability to create a metaphor template, either manually or automatically. Assuming that the manual approach is selected (step 176) an initiating metaphor element is brought up on the screen to begin the metaphor template development. Initiating metaphor elements preferably include program attributes of a given job and the programmed job attributes may have their source in a suitable dialog, such as a dialog of the type shown in U.S. Pat. No. 5,398,289. In the examples of FIGS. 12 and 13, the initiating metaphor element is shown as a document icon, but in other examples the initiating metaphor element could assume the form of a storage icon indicating that the document is disposed at a local or remote storage location.

To initiate the template building process (step 178), a device metaphor, such as a metaphor representing a scanner, a printer, a facsimile device or an E-mail destination is coupled with the initiating metaphor element by way of a connector arrow of the type shown in FIGS. 12 and 13. The connector is associated with code that permits a document, represented by a set of job requirements, to be executed in accordance with a device profile. In one example, connector code may serve to automatically "drag and drop" a job/document into a device. Prior to adding another element (step 180), a determination is made as to whether the template is branching off into another combination. As will be understood, by reference to FIGS. 12 and 13, a given template can include multiple combinations so that, for example, output can be provided to multiple locations. Assuming that a branch point is encountered (step 182), information about the branch point, more specifically its location in the metaphor template, is stored at the server 122 (FIG. 6). As will be recognized from the description below, information about the branch point is stored because it is desirable to complete one combination at a time rather than branching off and developing another combination before the current combination is finished.

If it is found, at step 184, that the current combination is not finished, another device metaphor is added to the current device metaphor (step 186) and the process returns to step 180 where another determination as to the possible existence of a branch point is made. When it is determined at step 184, that the current combination is complete, a check is made at step 188 to determine if all combinations have been completed to thus develop the metaphor template of the subject job [Connector is a group of code that permits a set of job requirements to be executed with a given profile provided that no conflicts between the requirements and the profile attributes exist.]

Assuming that all combinations are not complete in the metaphorical template, a next available branch point is located at step 190. The locating step 190 can be implemented readily by suitable code that moves the process to one or more branch points determined in step 180. As should be understood, a device metaphor can be coupled with another device metaphor or an initiating metaphor element. Accordingly, in view of the query at step 192, the process may either move back to step 178, so that a device metaphor can be coupled with the initiating metaphor element, or to step 194 where the device metaphor can be coupled with another device metaphor.

In the preferred embodiment, each metaphor element is mapped to one or more devices having a common general function. That is, in one example, a device metaphor may be mapped to a plurality of printers. In turn, referring to FIG. 9, in the preferred embodiment of the manual template development process a first device metaphor is selected (step 198) by, for example, double clicking the selected device metaphor, with a conventional pointing device, to display one or more device choice(s). In certain circumstances, it may not be clear to a user which device is preferable unless the attributes of one or more choices are examined. Accordingly, steps 200, 202 and 204 provide the user with the ability to examine the attributes of one or more choices through use of user interface 142 (FIG. 6).

Figure 9:
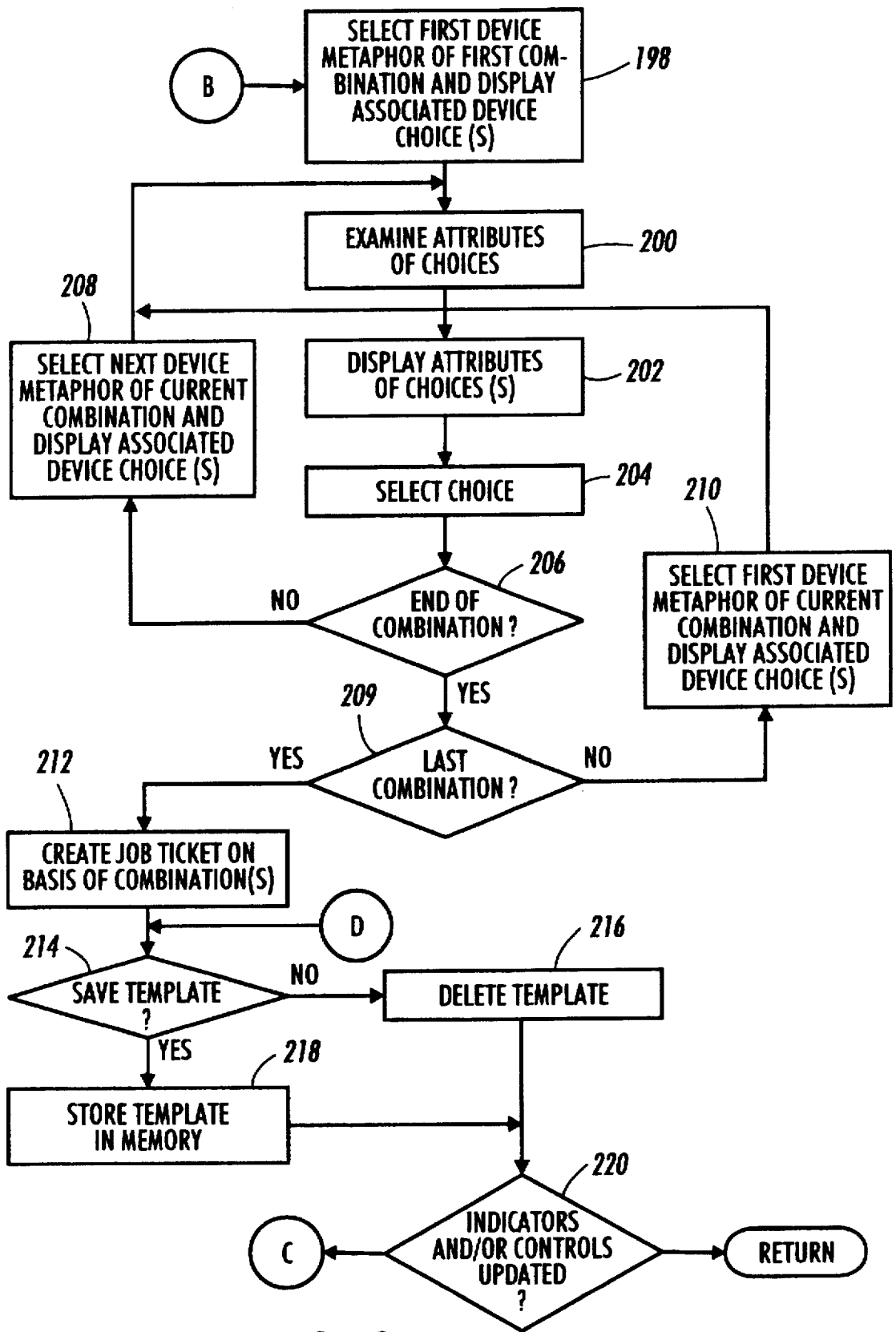

For ease of viewing, in the preferred embodiment, the choices and attributes are shown in terms of pull down menus, disposed in hierarchical order, in an implementation similar to that used by Microsoft in a typical windows operating system environment. The choice selection is typically made with a cursor system through use of double clicking or box checking. The approach of FIG. 9 is recursive and each combination is considered to determine user preference with respect to choices. Assuming the end of the combination has not been met (step 206) another device metaphor is selected (step 208) so that the user can examine attributes of the next device and make a suitable choice in accordance with the above-described procedure. The technique of making choices for each combination is implemented with steps 209 and 210 and the process continues to loop back to step 200 until decisions have been made for each developed metaphorical combination.

Once the metaphorical template is complete (step 208), one or more job tickets based on the one or more programmed combinations are created. In practice, a job ticket is created automatically for each selected choice (step 204) by transferring pertinent information of the choice to a dedicated job ticket dialog. In the common scenario, a composite job ticket including one or more input tickets obtained from the attributes in the, for example, initiating metaphor element and a plurality of output tickets derived from the selected choices is provided.

Upon creating the metaphorical template with its corresponding job ticket(s) (step 212), the user is provided with the opportunity, at step 214, to save the template at the client 82. If there is no desire to save the template, the metaphorical template is deleted, at 216, subsequent to the creation of the composite job ticket at step 212. On the other hand, the user may store, via step 218, the program template in the memory of the client for future use. Referring to FIG. 12, upon storing a metaphorical template in memory, it may be desirable to link the location of the stored template with a button or a graphic selection bar. In practice, a given button may be labeled in accordance with a system similar to that of Microsoft's Word 6.0. Preferably, a given metaphorical template as shown in FIG. 13 is supplemented with various control and status graphical indicators.

At step 220, a user is provided with the opportunity to supplement each device with one or more of these graphical indicators. A detailed description of the graphical indicators with their attendant functionality is provided in FIG. 11.

Referring again to step 174 of FIG. 8, the user decides whether the metaphorical template is to be created manually or automatically. Provided an automatic implementation is desired, the process proceeds to step 224 (FIG. 10) where the user develops a partial template in which at least one initiating metaphor element and one device or storage metaphor are provided. As indicated in the discussion of FIG. 7, the application server is provided with a plurality of combinations which represent the available metaphorical templates available throughout the network system.

It will also be understood that combinations can be developed readily from the database in accordance with a supplied search term, these sorts of dynamic searches are conventional and implementations can be obtained from known dynamic searching techniques of the type provided by Mead data in their Lexis/Nexis application. Referring to step 226, a search term, developed by way of step 224, is employed to obtain all related combinations, i.e. instances on the basis of the entries in the database. In practice, the search term is developed from selected attributes in the job initiating metaphor and one or more attributes from the one or more attached device metaphors. Indeed, the selected attributes can be constrained to include only certain classes of attributes, such as stock attributes only.

Upon performing the database search, the user is informed, at step 228, of all those combinations in the network which include the attributes of the selected search term. As should be understood, the search term can be relatively broad or narrow depending on the attributes selected to develop the database search term. Depending on the instances developed, the user may wish to limit or expand the scope of this search at step 230. To change the search scope, either a heuristic term may be entered (step 232) or the search term based on step 224 may be narrowed. When a heuristic term is added to the search term, an augmented term is obtained, and when the search is narrowed, a narrowed search term is obtained. The augmented search term may accommodate for, among other things, convenience, cost, device proximity, device/attribute quality, and/or personal preference. In the preferred embodiment, additional attributes are provided for various device choices to correspond them with potential heuristics. For example, printers may be designated as "local" or "remote" so that when a proximity heuristic is included in the augmented search term, the user can be informed of all those printers which are local or remote.

In response to augmenting or narrowing the search term, an additional search, based on the new search term, is performed at step 234. Essentially, the additional search eliminates all instances not fulfilling the augmented or narrowed search. At step 236, the user is informed of the number of instances developed as a result of the additional search and if the number of instances is found to be acceptable, then each of the templates corresponding to the instances is displayed at step 240. In one example, the user scrolls through each metaphor template developed as a result of the additional search. As a result of scrolling through the various templates corresponding with the entered search term, the user, at step 242, chooses an instance to serve as the template. In accordance with the template chosen, a composite job ticket is created in a manner consistent with that described above.

Figure 11:
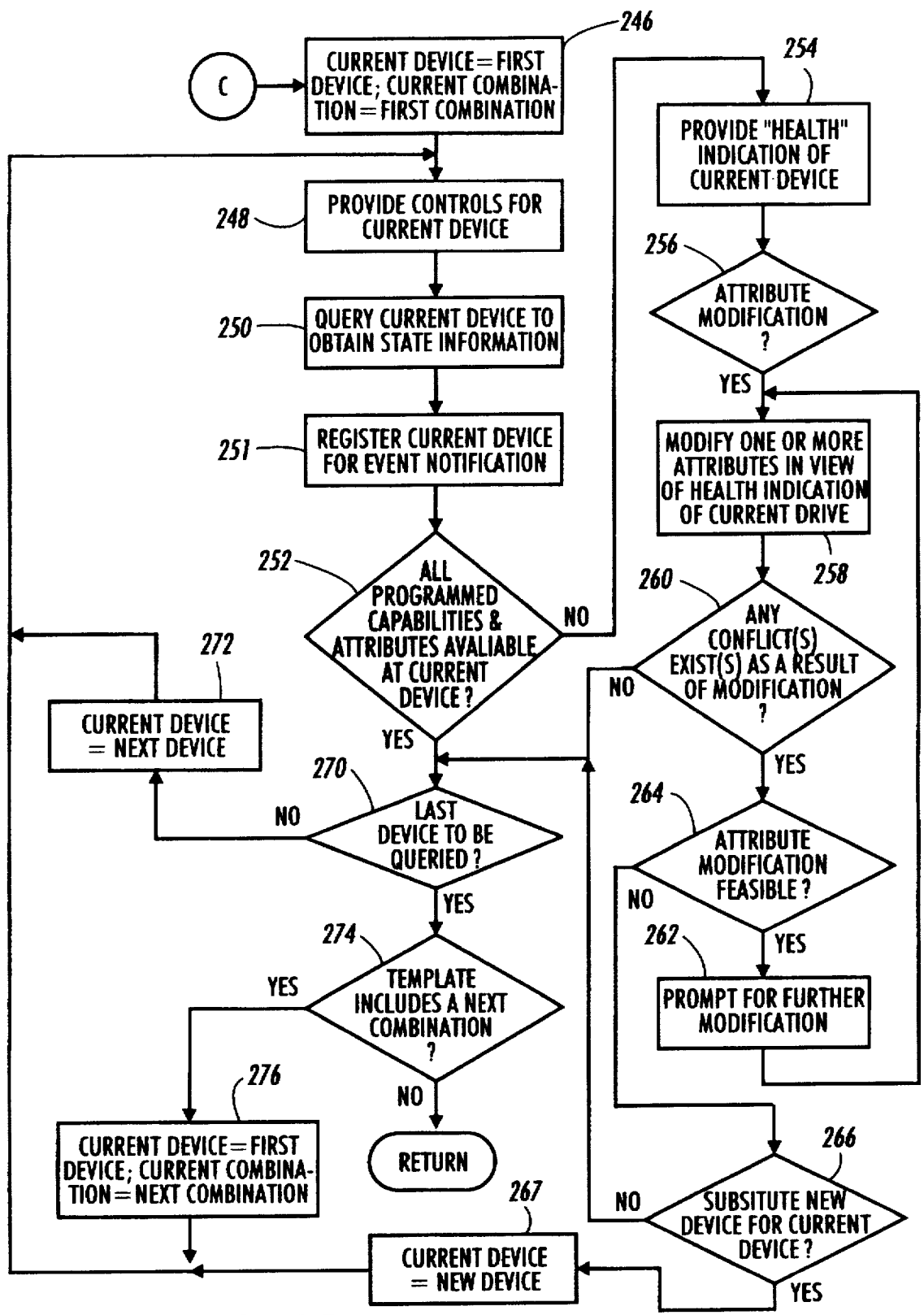

Referring to FIG. 11, a technique for augmenting a metaphorical template to maximize operational flexibility is described. In general, the technique described by FIG. 11 permits graphic indicators to be added to each metaphor element and facilitates the attribute modification of individual metaphors as required. Referring specifically to step 246, a first device of a first combination is selected. In the illustrated embodiment of FIG. 11, one or more control graphic indicators, designated in FIG. 13 as "controls" is provided for each metaphor element of a metaphorical template (step 248). Each of the graphic controls indicators are generated as icons and their functional capability is based on the ability of the application server to communicate the host client with a designated device on the network. This communication is preferably facilitated by use of suitable protocols, which might include, among others, one or more protocols made available by Xerox network systems ("XNS").

Initially, at step 250, the application server queries a device to obtain suitable state information. The state information can be obtained through use of one or more of the above-discussed profiles and a suitable state holding arrangment employing concepts disclosed by the above-mentioned DPA model and/or the virtual machine arrangement of U.S. Pat. No. 5,170,340. As will be appreciated by those skilled in the art, it is desirable to maintain a relationship in which each device automatically informs the application server of its current status. Accordingly, at step 251 a device, for which an indicator is being provided, is registered with the application server for event notification. Event notification can be provided through use of a suitable protocol, such as SNMP as discussed in further detail in U.S. Pat. No. 5,367,635 to Bauer et al., the pertinent portions of which are incorporated herein by reference. Referring specifically to FIGS. 13, it will be appreciated that both controls and status indicators are provided for each of the device metaphors.

As one or more graphic indicators are provided for a metaphor, the process checks, at step 252, whether all of the programmed capabilities or attributes are available at the current device being examined. Typically, a user will be interested in available attributes, but in some circumstances particular users such as system administrators may be interested in programmed capabilities of a machine.

Assuming that all of the programmed attributes at the current device under examination are not available, the process proceeds to step 254 where a health indication (see status indicator in FIG. 13) is provided. As mentioned above, the status indicator is updated with state information provided to the application server from the profiles or transfer function information associated with the various devices on the network. The health indication may be provided in one of several forms. In the example of FIG. 13, up and down arrows are employed to indicate "go" and "no go" conditions.

In other contemplated forms health indication could be provided by coloring the icons (e.g. "yellow" for temporary delay in operation, "red" for indefinite delay in operation and "green" for completely operable) or the connector arrows between the metaphors could be made to visually flash so that a user understands when a component of a metaphorical combination is temporarily out of order. It is contemplated that the indicators will include property profiles which can be displayed by selecting a given indicator with a pointer. As will also be appreciated, with the advent of multimedia, health indication could be provided to a client workstation (FIGS. 5 and 6) in the form of a sound indicator for indicating that one or more programmed attributes are not available at a subject device. Such sound based health indicator could be achieved through use of a suitable multimedia support board provided at the client workstation.

Upon selecting the indicator, the user may decide, at step 256, to modify an attribute of the job or an attribute associated with the selected metaphor. In one example, it may be indicated that the operation of a selected device is simply delayed. Under these circumstances, a user may wish to proceed with examining the various devices of the metaphorical template without altering the job or the device under examination. On the other hand, at step 258, one or more attributes of either the job or the device associated with the subject metaphor may be altered in view of the status indicator of that device. As will be appreciated, as a result of modification, a conflict may arise between the device attributes within the metaphorical template. For example, an output stock choice at a scanner may be changed to transparency and the job ticket corresponding with the metaphorical template may call for duplexing at a printer of the template. Since most systems do not allow duplexed transparencies, an appropriate flag will be raised as a result of the check of step 260.

Assuming a conflict exists, the process prompts the user to provide further modification (step 262), provided attribute modification is feasible (step 264). There are circumstances, however, where attribute modification will not be feasible as a result of the degree of impairment of the current device (i.e. the device under examination). In this event, a new device may be substituted for the current device (step 266) and the new device will, via step 267, assume the role of the current device. As will be appreciated, the substitution of 266 could be performed manually or automatically.

Assuming that attribute modification is not required, or that no conflict exists as a result of modification, the process proceeds to step 270 where a determination as to whether the last metaphor in a metaphorical combination has been encountered is made. Assuming further metaphors have not been examined in the current metaphorical combination, the process proceeds to the next metaphor (step 272) and appropriate indicators are provided for the current combination by way of steps 248, 250 and 252. When the last device for a particular metaphorical combination has been queried/registered, it is determined via step 274 whether any further control/state information is to be provided for another metaphorical combination in the metaphorical template. For a next combination (step 276), the first unexamined metaphor is located and the process returns to step 248. Generally, the first unexamined metaphor will exist at a branch point, the information for which branch point will have been stored in accordance with the methodology described above.

Examples corresponding to the embodiment of FIGS. 8 and 9 are provided in FIGS. 12 and 13. Referring specifically to FIG. 12, a manual approach for developing a template, namely "Temp.1.0", is described. Initially, a user obtains five metaphors, namely a job initiating metaphor 280, a scanner metaphor 282, a printer metaphor 284 and E-mail indicator 286, and a fax related metaphor 288, from the application server (FIG. 6). These metaphors are laid out on the user interface screen 142 and the various metaphors are linked to one another with connector icons 300. After laying out the metaphor elements and the icon connectors, the scanner metaphor 282 is selected with a conventional pointer 302 so that scanner choices and associated attributes are displayed. In the example of FIG. 12, two scanner choices are shown and a selected group of attributes corresponding with one of the choices is also shown. In accordance with the method of FIGS. 8 and 9, the user chooses scanner 1 and associated attributes, such as stock size (in this example "8½×11").

After making the appropriate selection at the scanner, the user proceeds to metaphor 284 and selects the same with the pointer. It should be noted that the printer provides selections that are consistent with the scanner 1 and in the example of FIG. 12, the printer of building 2 is not available since it is incompatible with the scanner 1. Moreover, the user chooses the north printer and the stock selection of 11×17 is not made available since the scanner is not capable of handling 11×17 stock. As shown on the screen 142, each unavailable selection is "grayed out". The above described procedure for selecting printer metaphor 284 is repeated for metaphors 286 and 288 so as to complete development for the metaphorical template Temp.1.0.

Once Temp.1.0 is developed completely, it can be stored in memory of the system 10 or deleted. For future use of a stored template version, the version can be referenced to a button or graphic control on a conventional tool bar 304 (FIG. 12). In turn, the button can be used to facilitate the automatic fetching and displaying of the stored template version.

Figure 10:
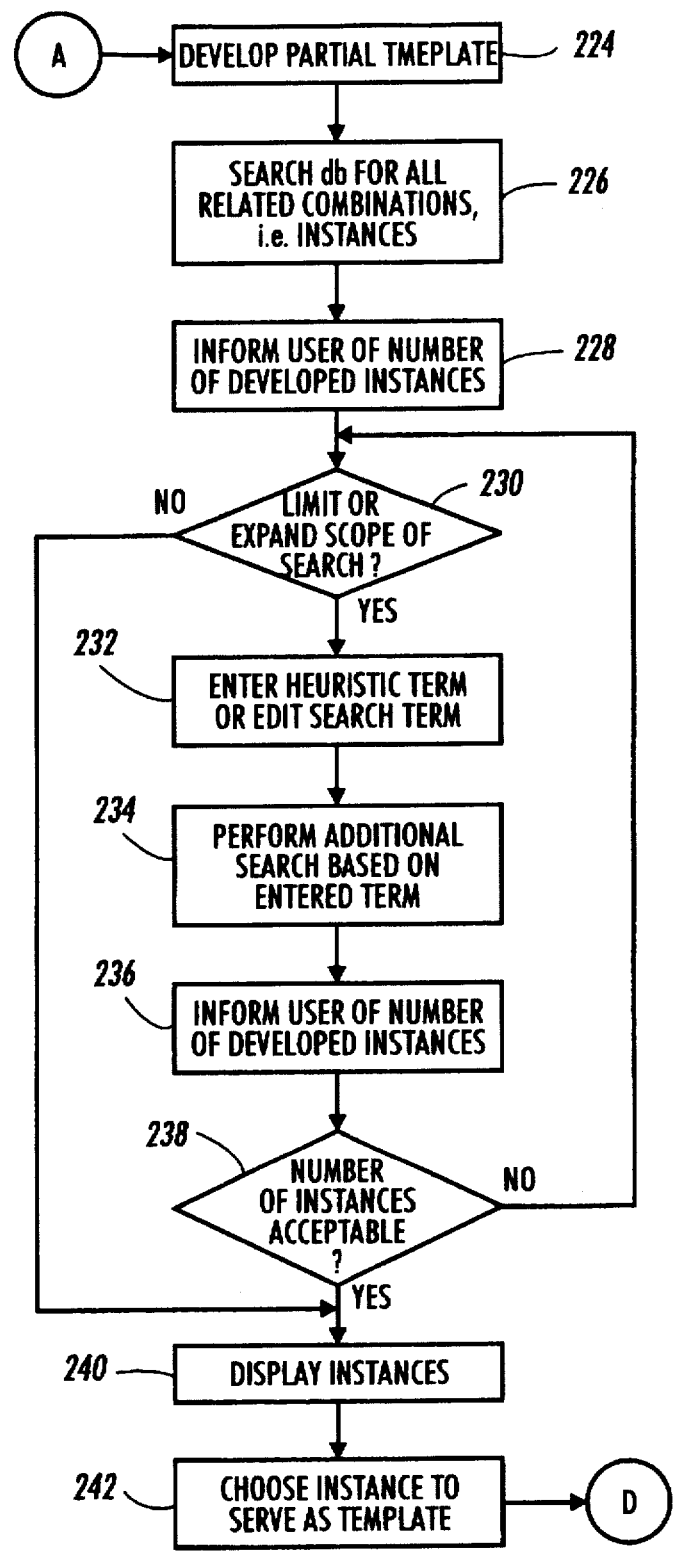

Referring to FIG. 13, an example incorporating some of the concepts of FIGS. 10 and 11 is described. In the example of FIG. 13, the user provides metaphor elements 280, 284 and 286. Pursuant to the process of FIG. 9, the user provides the system with a heuristic indicating that s/he desires a scan-to-file process. Accordingly, the scanner 282 and storage device 306 are added to the system automatically. It will be appreciated that the example of FIG. 13 assumes that only one scan-to-file arrangement is available. But in actual practice, many instances of scan-to-file may be available and the user will be required to choose one of those instances in accordance with the procedure of FIG. 9.

Additionally, each of the metaphors is provided with appropriate indicators in accordance with the procedure of FIG. 11. As will be recognized, the template of FIG. 13 includes a problematic combination as a result of printer 284 (the status arrow of that printer indicates an operational impairment). Nonetheless, as a result of employing the controls, which permit certain combinations to be executed while other combinations are being suitably modified, the combination including metaphor elements 280, 282, 286 and 306 may be executed while suitable modifications are made to the job or the printer so that the combination including 280, 282, 284 and 306 can thereafter be executed.

Numerous features of the above-described embodiment can be appreciated by those skilled in the art. First, a technique is provided in which a user can develop a metaphorical template manually, which template is ultimately stored for usage in the form of a job ticket. In the manual approach for developing templates, the user can make choices of devices at each metaphor element and override default attributes if so desired. The orderly management of the available choices and attributes is provided transparently by an application server which updates attribute profiles dynamically. Consequently, the system of the preferred embodiment assists the user in avoiding the programming of unfeasible metaphorical combinations, and hence unfeasible job tickets.

Second, a technique is provided in which templates are automatically generated in response to a search initiated by the user. In turn, the search develops all instances corresponding to the search available on a network. The search can be limited or expanded through the entering of a heuristic term or narrowing term. Once a satisfactory search has been performed, the developed instances can be displayed and the suitable instance which is to serve as a template can be chosen. In either the manual or automatic approach, a developed template can be stored by a client in, for example, the form of a button so that the user can replicate the stored template, at a future moment, in an efficient manner.

Finally, for a given template, indicators can be provided for each metaphor element to facilitate the job ticket creation process in several respects. In one example, a status indicator is provided for each metaphor to indicate the operational status of a corresponding device. In view of the status indicator, the user can modify a job or the device in order to facilitate processing of the job. In yet another example, each metaphor element can be provided with a controls indicator so that one combination within a template can be executed while modifications are being made to another metaphorical combination. Consequently, for a given metaphorical template, certain metaphorical combinations can be executed while others are being revised or redeveloped. Preferably, each of the devices is configured in such a way that the status indicators are dynamically updated. As will be understood, this dynamic updating greatly facilitates use of the controls indicators which permit the user to start and stop selected devices depending on their current status.

What is claimed is:

1. In a network document processing system with memory where a plurality of metaphor elements are supplied for programming a job with a job ticket, each of the plurality of metaphor elements corresponding with either a set of one or more document processing devices or a set of one or more storage devices and having a graphical appearance representative of a document processing or storage device with which the graphical metaphor is related, wherein each document processing device or each storage device communicates with a network, a system for programming the job ticket with a metaphorical template including at least two of the metaphor elements, comprising:

a) a set of user preferences stored in the network document processing system memory;

b) an application server, communicating with the network, for storing a first set of attributes corresponding with the capabilities of a first document processing device or a first storage device and a second set of attributes corresponding with the capabilities of a second document processing device or a second storage device, wherein the second document processing device or the second storage device is disposed on the network remotely of the first document processing device or the first storage device;

c) said application server registering a first one of the plurality of metaphor elements with the first attribute set and a second one of the plurality of metaphor elements with the second attribute set;

d) a user interface with a screen display for displaying the first one of the plurality of metaphor elements in response to user input;

e) said application server linking the first one of the plurality of metaphor elements with the second one of the plurality of metaphor elements automatically, in response to said application server reading of the set of user preferences, to form the metaphorical template including the at least two of the metaphor elements, the metaphorical template being displayed on the user interface screen display when a user displays the first one of the plurality of metaphor elements on the screen display of said user interface and the metaphorical template corresponding with a combined set of attributes, the combined set of attributes including one or more attributes from each of the first and second attribute sets; and f) a system for programming the job ticket with selected attributes from the combined attribute set of the metaphorical template.

2. The job ticket programming system of claim 1, wherein the combined set of attributes is developed with said application server prior to displaying the one of the plurality of metaphor elements.

3. The job ticket programming system of claim 1, wherein:

a third set of attributes, represented by a third one of the plurality of metaphor elements and corresponding with the capabilities of either a third document processing device or a third storage device, is provided; and the first one of the plurality of metaphor elements is linked automatically with the third one of the plurality of metaphor elements in response to displaying the first one of the plurality of metaphor elements on said screen display.

4. The job ticket programming system of claim 1, further comprising:

a third set of attributes, represented by a third one of the plurality of metaphor elements and corresponding with the capabilities of either a third document processing device or a third-storage device, is provided; and the second one of the plurality of metaphor elements and the third one of the plurality of metaphor elements are linked automatically in repsonse to displaying the first one of the plurality of metaphor elements.

5. The job ticket programming system of claim 1, the first attribute set is modified automatically in response to changing the available capabilities at the first document processing or first storage device.

6. In a network document processing system with memory where a plurality of metaphor elements are supplied for programming a job with a job ticket, each of the plurality of metaphor elements corresponding with either a set of one or more document processing devices or a set of one or more storage devices and having a graphical appearance representative of a document processing or storage device with which the graphical metaphor is related, wherein each document processing device or each storage device communicates with a network and an application server communicates with the network, a method for developing a metaphorical template, including at least two of the metaphor elements, for use in programming the job ticket, comprising:

a) storing a set of user preferences in the network document processing system memory;

b) storing both a first set of attributes corresponding with the capabilities of a first document processing device or a first storage device and a second set of attributes corresponding with the capabilities of a second document processing device or a second storage device with the application server, wherein the second document processing device or the second storage device is disposed on the network remotely of the first document processing device or the first storage device;

c) registering, with the application server, a first one of the plurality of metaphor elements with the first attribute set and a second one of the plurality of metaphor elements with the second attribute set;

d) reading the set of user preferences with the application server;

e) using the application server to link the first one of the plurality of metaphor elements with the second one of the plurality of metaphor elements automatically, in response to said reading of the set of user preferences, to form the metaphorical template, the metaphorical template including both the first one of the plurality of metaphor elements and the second one of the plurality of metaphor elements;

f) displaying the metaphorical template in response to a user displaying the first one of the plurality of metaphor elements on a screen display of a user interface, the metaphorical template corresponding with a combined set of attributes, the combined set of attributes including one or more attributes from each of the first and second attribute sets and being usable in programming the job ticket.

7. The method of claim 6, further comprising developing the combined set of attributes prior to said (f).

8. The method of claim 6, further comprising:

providing a third set of attributes, represented by a third one of the plurality of metaphor elements and corresponding with the capabilities of either a third document processing device or a third storage device; and automatically linking the first one of the plurality of metaphor elements with the third one of the plurality of metaphor elements in response to displaying the first one of the plurality of metaphor elements on said screen display.

9. The method of claim 6, further comprising:

providing a third set of attributes, represented by a third one of the plurality of metaphor elements and corresponding with the capabilities of either a third document processing device or a third storage device; and automatically linking the second one of the plurality of metaphor elements with the third one of the plurality of metaphor elements in response to displaying the first one of the plurality of metaphor elements.

10. The method of claim 6, further comprising automatically modifying the first attribute set in response to changing the available capabilities at the first document processing or first storage device.

* * * * *